3,057,678
PREPARATION OF ZIRCONYL CHLORIDE OCTAHYDRATE
Abraham Clearfield, Niagara Falls, N.Y., assignor to National Lead Company, New York, N.Y., a corporation of New Jersey
No Drawing. Filed Mar. 2, 1959, Ser. No. 796,233
7 Claims. (Cl. 23—85)

The invention of this application is concerned with the production of zirconyl chloride octahydrate and particularly relates to a novel process by which this material may be conveniently prepared in a very high state of purity.

In present practice chemically pure zirconyl chloride is made by recrystallizing the commercial grade. Two methods for accomplishing this have been found disclosed in the literature, but neither method is satisfactory. One (German Patent No. 290,878, May 29, 1914) involves dissolving commercial or impure zirconyl chloride in water, filtering, and then adding sufficient concentrated hydrochloric acid to make the solution 8–10 normal in HCl. This process requires large amounts of relatively expensive, high purity hydrochloric acid and the crystals of zirconyl chloride octahydrate produced are difficult to filter. The other method (J.A.C.S., 76, 5878 (1954)) involves adding a solution of impure zirconyl chloride to a mixture of acetone and hydrochloric acid. Since the acetone-hydrochloric acid mixture is diluted by water from the solution, it can be used only once and this process is, therefore, also quite expensive.

It is an object of the present invention to provide a novel process for making chemically pure zirconyl chloride octahydrate.

Another object of the invention is to provide an economical process for the manufacture of chemically pure zirconyl chloride octahydrate directly from zirconium tetrachloride.

A further object of the invention is to provide a process of the character described which may be conveniently carried out in conventional equipment.

Other objects and advantages of the present novel proces will be apparent from the following description thereof.

The novel process, by which a product more than 99.9 percent pure can be obtained, broadly comprises the steps of dissolving zirconium tetrachloride in an alcohol, filtering the solution to remove insoluble impurities, adding water in such amount as to hydrolyze the zirconium tetrachloride and cause precipitation of zirconyl chloride octahydrate and separating the precipitated product from the mother liquor which may then be reused for solution of zirconium tetrachloride. In the following example there is set forth the preferred manner in which the process is carried out.

EXAMPLE 1

Sixty grams of commercial zirconium tetrachloride was dissolved in 100 ml. of methanol and filtered to remove insoluble impurities. Sixty milliliters of water was then added to the solution and the mixture was stirred for 1 hour during which time crystals of zirconyl chloride octahydrate were precipitated. These crystals were separated from the mother liquor by vacuum filtration and were then dried at 50° C. The product was a free-flowing, water-soluble, crystalline powder which was only faintly yellow in color and lacked the irritating odor usually associated with zirconyl chloride. The yield of product was excellent since it contained 96 percent of the zirconium in the starting zirconium tetrachloride.

The mother liquor remaining after carrying out the process as set forth in the foregoing example contains water, hydrochloric acid, methanol and a little dissolved zirconyl chloride along with some soluble impurities. It is, however, feasible to reuse the mother liquor for dissolving zirconium tetrachloride by merely adding methanol thereto. Such reuse, with methanol addition after each precipitation, may be repeated a number of times with satisfactory results. In the following example the reuse of the mother liquor is described.

EXAMPLE 2

The mother liquor recovered from carrying out the process of Example 1, amounting to 78 ml., was brought back to strength in methanol by adding enough to again bring the volume to 100 ml. Sixty grams of zirconium tetrachloride was dissolved in the fortified liquor and the solution was filtered while still hot. Fifty-five milliliters of water was then added to the filtered solution and the mixture was stirred for an hour. The resulting precipitate of zirconyl chloride octahydrate was removed by filtration and dried as in Example 1. The product yield was over 95 percent.

While X-ray examination of the products precipitated by the method of the present invention show them to be zirconyl chloride octahydrate, the products lose water of hydration readily upon standing or during drying, tending to change to the hexahydrate. Consequently, the dried material has a composition lying between $ZrOCl_2 \cdot 8H_2O$ and $ZrOCl_2 \cdot 6H_2O$.

The purity of the product obtained by the process described in Example 1 is very high, the impurities other than hafnium totaling less than .05 of one percent. Even when the mother liquor is repeatedly reused in the manner described in Example 2 the purity of the zirconyl chloride obtained is over 99.9 percent. In the following table are shown analyses of typical dried products obtained in the first precipitation according to the present process and on the fourth precipitation when reusing the mother liquor.

*Table A*

| | First Precipitation, percent | Fourth Precipitation, percent |
|---|---|---|
| $Al_2O_3$ | .002 | .005 |
| BaO | .002 | .01 |
| CaO | | |
| CuO | .0005 | .002 |
| $Fe_2O_3$ | | .001 |
| $K_2O$ | | .01 |
| $Li_2O$ | | |
| MgO | | |
| $Na_2O$ | | |
| $Ni_2O_3$ | .02 | |
| PbO | .01 | |
| $SiO_2$ | | .02 |
| $SnO_2$ | | |
| SrO | | |
| $TiO_2$ | .002 | .01 |
| ZnO | | |
| $ZrO_2$ | 41.8 | 41.2 |
| Cl | 22.0 | 20.7 |

In Table A the amounts of impurities shown were determined spectroscopically. It is evident that even on the fourth use of the mother liquor an extremely pure product is obtained. Products of this degree of purity may be used directly for a number of applications where the usual commercial or technical products are not suitable. For example, zirconyl chloride octahydrate made by the present process may advantageously be used in preparing anti-perspirant compositions as described in U.S. Patent No. 2,814,584, as well as in the manufacture of pharmaceuticals, deodorants and dyes.

In the analyses set forth in Table A the hafnium contents of the products are not determined or stated. Zirconium and hafnium are unique in being so closely related in chemical properties that the few percent of hafnium always occuring with zirconium are separated therefrom only with great difficulty and expense. For substantially all purposes hafnium compounds are indistinguishable from the corresponding zirconium compounds and are not, therefore, regarded as impurities. Indeed, the present process may be utilized if desired in the preparation of pure hafnyl chloride from hafnium tetrachloride. It has, however, been determined that the present process is specific to the production of zirconyl and/or hafnyl chloride and is not adapted for the preparation of other zirconyl and/or hafnyl halides or of titanyl halides.

In carrying out the present novel process the amount of zirconium tetrachloride dissolved in 100 ml. of alcoholic solvent may vary somewhat from the 60 grams specified in Example 1. Although the best results have been obtained with approximately 60 grams, from about 50 grams to about 70 grams of $ZrCl_4$ may be used with almost as good results. However, with more than about 70 grams of zirconium tetrachloride per 100 ml. of solvent the increased viscosity of the solution makes filtration difficult. Further upon the addition of water to such a solution a solid crystalline mass that is difficult to handle may result. On the other hand, if less than about 50 grams of $ZrCl_4$ per 100 ml. of solvent is employed, the HCl concentration in the solution after hydrolysis of the $ZrCl_4$ is so low that an excessive amount of zirconyl chloride remains in solution.

Stated as approximate percentages the $ZrCl_4$ content of the alcoholic solutions mentioned above ranges from about 38 percent to about 47 percent with a content of 43 percent being preferred. Since, however, unless special precautions are taken, some of the alcohol will evaporate even at ambient temperatures and evaporation may be increased by the heat evolved by the exothermic solution of $ZrCl_4$ in the alcohol, the solutions as used will often be somewhat richer in $ZrCl_4$. Accordingly, as used the solutions may contain as much as about 50 percent $ZrCl_4$ and the preferred range is from about 43 percent to about 45 percent based on the total weight of the solution. All percentages specified herein and in the accompanying claims are by weight and not by volume.

The amount of water added to the solution of zirconium tetrachloride in alcohol to precipitate the pure zirconyl chloride octahydrate may also vary. To obtain good recoveries of product at least 11 and preferably 13 to 15 mols. of water per mol. of zirconium should be added to the alcohol solution. However, addition of more than 15 mols. of water per mol. of zirconium is undesirable since the mother liquor is thereby so diluted as to reduce the yield of product. In precipitating pure zirconyl chloride octahydrate from a solution of zirconium tetrachloride in recovered alcoholic solvent, it should be remembered that the solvent already contains some water so that less need be added. Accordingly, the percentage content of $ZrCl_4$ in the solution will be somewhat less than in the original alcohol solution. In such cases the amount of water added should be 9 mols. of water per mol. of zirconium in the solution plus enough additional to make up for that lost by evaporation from the solution and removed with the product during filtration.

While in the foregoing examples methanol has been used as the solvent for the zirconium tetrachloride, it has been found that other water-miscible alcohols, such as ethanol and isopropanol, may be used equally as well. Since, however, they are more expensive, they are not, in general, used even though they are somewhat less volatile than methanol. It has also been found that solvents such as ethyl acetate may be mixed with the alcohol solvents if desired although no advantage has been found in the use of such mixtures.

As shown above, the zirconyl chloride obtained by the novel process of the present invention is extremely pure. The process is convenient, uses relatively inexpensive materials and has a good yield. Moreover, as pointed out, it is possible to reuse the solvent several times without deterioration in the purity of the product. It is evident, therefore, that the process is a valuable one and one which constitutes a significant advance in the art.

I claim:
1. A process for the production of highly pure zirconyl chloride octahydrate which comprises forming a solution of impure zirconium tetrachloride in a water-miscible alcohol, said solution containing from about 38–50 percent of zirconium tetrachloride, filtering said solution, adding to said solution from 11 to 15 mols. of water per mol. of zirconium in said solution whereby to precipitate at least 90 percent of the zirconium as zirconyl chloride octahydrate, and filtering out said precipitate.

2. A process as set forth in claim 1 in which the alcoholic solution contains about 43–45 percent zirconium tetrachloride.

3. A process as set forth in claim 1 in which the zirconium tetrachloride is dissolved in methanol.

4. A process as set forth in claim 1 in which from 13 to 15 mols. of water per mol. of zirconium is added.

5. A process as set forth in claim 5 in which the zirconium tetrachloride is dissolved in methanol.

6. A process for the production of highly pure zirconyl chloride octahydrate which comprises dissolving zirconium tetrachloride containing impurities in a water-miscible alcohol to form a solution containing from about 38 percent to about 50 percent zirconium tetrachloride, filtering said solution, adding to said solution from 11 to 15 mols. of water per mol. of zirconium in said solution whereby to precipitate at least 90 percent of the zirconium as zirconyl chloride octahydrate, filtering out said precipitate, adding to the filtrate sufficient of said alcohol to produce an alcoholic solution having the same volume as the original alcoholic solution, dissolving impure zirconium tetrachloride in the alcoholic solution to form a solution containing from about 38 percent to about 50 percent zirconium tetrachloride, filtering said solution while hot, adding to said solution at least 9 mols. of water per mol. of zirconium in said solution in addition to enough water to make up for that lost by evaporation and removed during filtration, and filtering the resultant precipitate of zirconyl chloride octahydrate.

7. A process for the production of highly pure zirconyl chloride octahydrate which comprises adding to a filtered solution of impure zirconium tetrachloride in a water-miscible alcohol, said solution containing about 38–50 percent of zirconium tetrachloride, from 11 to 15 mols. of water per mol. of zirconium in said solution whereby to precipitate at least 90 percent of the zirconium as zirconyl chloride octahydrate, and filtering out said precipitate.

References Cited in the file of this patent
FOREIGN PATENTS
465,605        Great Britain _____ May 10, 1937

OTHER REFERENCES

Mellor: "Comprehensive Treatise on Inorganic and Theoretical Chemistry," vol. 7, page 146, Longmans, Green and Co., London and New York, 1927.

Bennett: Concise Chemical and Technical Dictionary, page 1001, Chemical Publ. Co., Inc., Brooklyn, N.Y., 1947.